April 30, 1946.   E. C. ROTHACKER   2,399,451
POWER PULLEY
Filed June 23  1944   2 Sheets-Sheet 1

Inventor
Edward C. Rothacker
By: Attys

April 30, 1946.  E. C. ROTHACKER  2,399,451
POWER PULLEY
Filed June 23, 1944  2 Sheets-Sheet 2

Inventor
Edward C. Rothacker

Patented Apr. 30, 1946

2,399,451

UNITED STATES PATENT OFFICE 2,399,451

POWER PULLEY

Edward C. Rothacker, Chicago, Ill.

Application June 23, 1944, Serial No. 541,801

6 Claims. (Cl. 74—333)

The present invention relates to power transmission means whereby the transmission of power from a prime mover, such as an electric motor, to a driven spindle or arbor in machine shop equipment can be given a wide variation in speed.

It is the principal purpose of my invention to provide a power transmission unit complete in itself which can be substituted for existing transmission units such as pulleys so as to give a multiple speed variation. More particularly my invention contemplates the provision of a power pulley having on the face thereof a plurality of stepped belt receiving channels and having on the interior thereof means whereby the pulley itself can be driven at either of two selected speeds with respect to the shaft on which the pulley is mounted. Stepped pulleys are of course well known in the art as a means of getting different speeds between a drive and a driven shaft. However, with my invention applied to the drive shaft, the belt which transmits power from the drive shaft to the driven shaft will have two separate independent ranges of speed.

The features and advantages of the present invention will appear more fully from the following description, reference being had to the accompanying drawings wherein a preferred form of the invention is shown. It is to be understood however that the drawings and description are illustrative only and are not to be taken as limiting the invention except insofar as it is limited by the claims.

Referring now in detail to the drawings, the present invention is embodied in a pulley body 6 which has a series of stepped belt receiving grooves 7 therein. The pulley body is hollow to provide a chamber 8 which is adapted to receive the mechanism by which the ranges of speed can be obtained while maintaining the full benefit of the pulley body as a stepped pulley for transmitting power from a prime mover shaft 9 to a belt (not shown) in one of the grooves 7 of the pulley.

Figure 5:
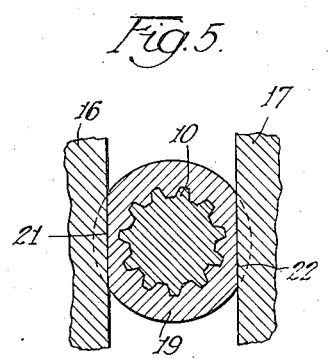
Fig. 5 is a fragmentary sectional view taken on the line 5—5 of Fig. 1.

The shaft 9 has a pinion 10 secured thereto by means of a hub part 11. The hub part 11 is stepped as indicated at 12 to provide a seat for a ball bearing assembly 13, the ball bearing assembly being situated on a shoulder 14 of the pulley body. The hub part 11 may be secured to the shaft by any suitable means such as set screws 15. The ball bearing assembly 13 is held in place by two bars 16 and 17 that are fastened by screws 18 (see Fig. 2) to the pulley body. The bars 16 and 17 are cut out as shown at 16' and 17' to clear the inner race of the assembly 13. The bars 16 and 17 also form part of a clutch by which the pinion 10 is locked to the pulley body 6. The other part of the clutch comprises a ring 19 that is slidably and non-rotatably mounted on the pinion 10 (see Fig. 5). This ring 19 has a lower portion 20 which is flattened at the side edges 21 and 22 so as to fit between the bars 16 and 17 when the ring 19 is lowered into the position shown in Fig. 1.

Figure 1:
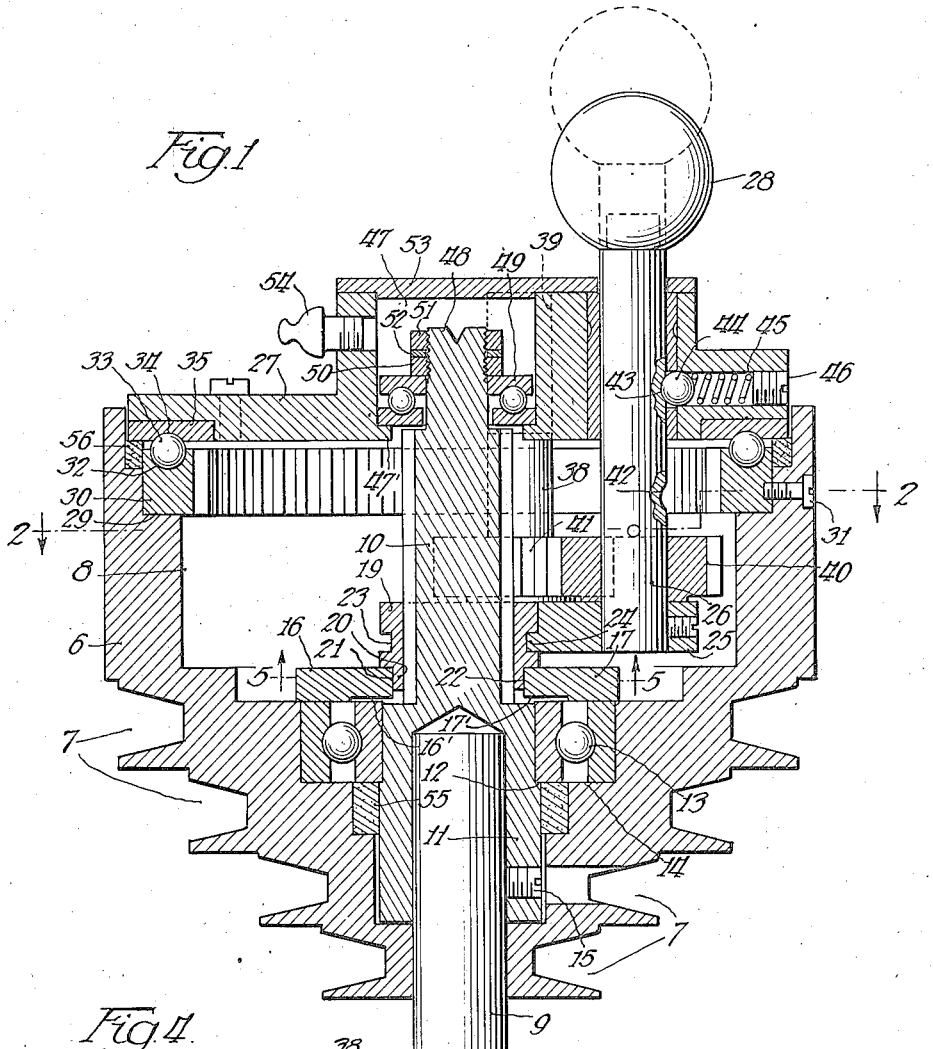
Fig. 1 is a longitudinal sectional view through a pulley embodying my invention.

The ring 19 is provided with an annular channel 23 which receives a curved flange 24 that is provided upon a gear mounting plate 25. The gear mounting plate 25 is fastened to a shaft 26 that projects upwardly as shown in Fig. 1 through a cover plate 27 for the pulley body 6. The outer end of the shaft 26 is provided with a handle 28 so that it can be raised or lowered and thus move the plate 25 and the ring 19 lengthwise of the pinion 10.

The body 6 is provided with a seat 29 near the cover plate 27 to receive an internal ring gear 30. The internal ring gear 30 is fixed in the body 6 against rotation by suitable means such as a screw 31 (see Figs. 1 and 2). In its face opposite the seat 29 the ring gear 30 is provided with a ball race 32 to receive ball bearing members 33 which engage in a similar race 34 provided in a plate 35 that is set into the cover member 27. The cover member 27 does not rotate with the pulley body 6; it provides the fixed part of the unit and has a bracket 36 thereon for mounting to a fixed portion 37 of the tool on which the pulley is used so as to relieve the shaft 9 of the strain of carrying the weight of the pulley and its associated mechanism.

Figure 2:
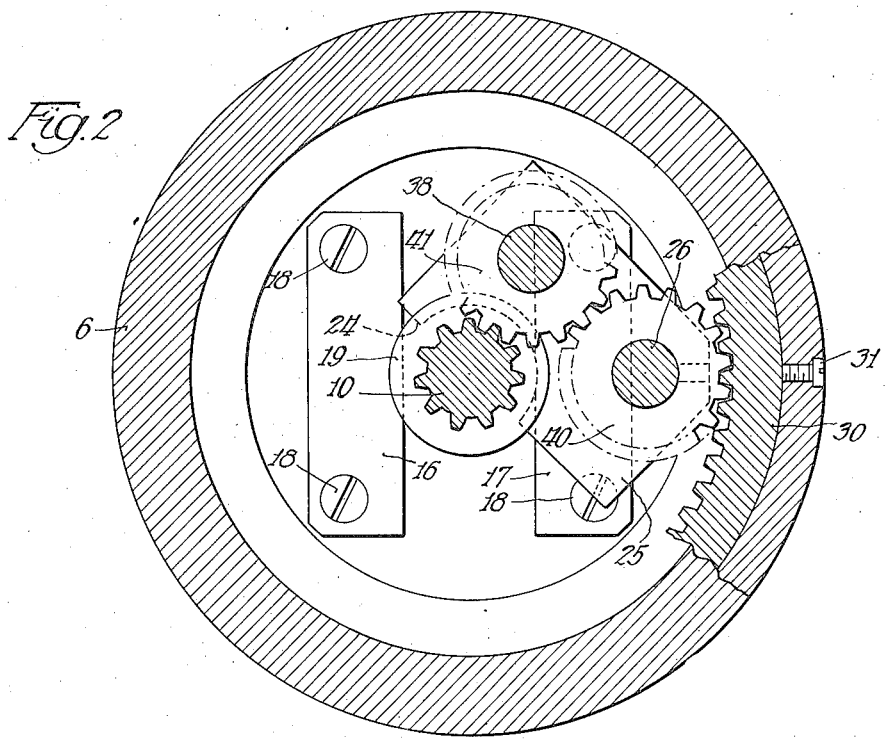
Fig. 2 is a sectional view taken on the line 2—2 of Fig. 1.
Figure 3:
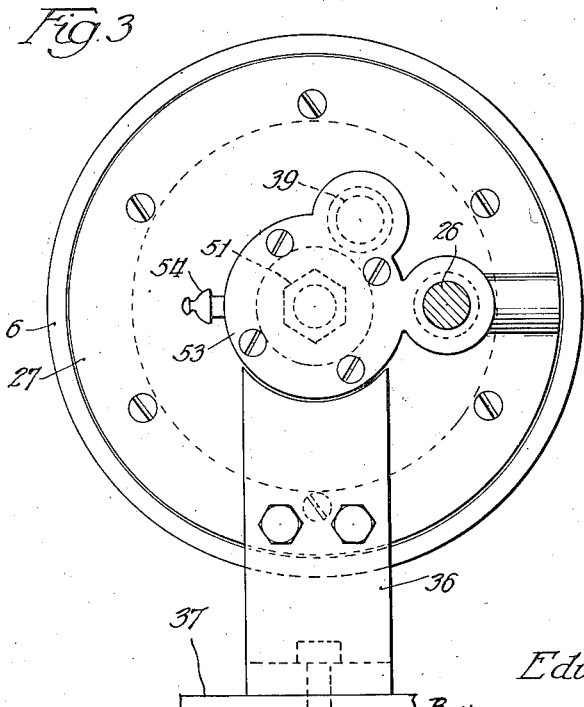
Fig. 3 is a plan view looking down on Fig. 1 with the control handle cut off.

The gear mounting plate 25, in addition to the shaft 26, carries another shaft 38 (see Fig. 2). The shaft 38 is extended upwardly from the plate 25 into a guide recess 39 provided in the cover member 27. The length of the shaft 38 is such that it still engages in the guide recess 39 when the plate 25 is in its lowermost position. When the plate 25 is raised the shaft 38 of course moves up in the recess 39.

Figure 4:
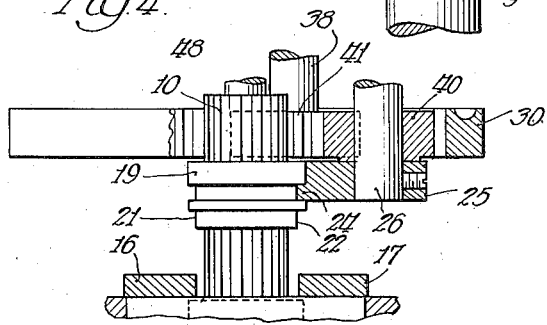
Fig. 4 is a fragmentary view illustrating the mechanism in a changed position from that shown in Fig. 1.

On the shafts 26 and 38 two gears 40 and 41 are mounted. The gear 41 meshes with the pinion 10 in all positions, while the gear 40 is continuously in mesh with the gear 41 and is adapted to be brought into and out of meshing engagement with the internal ring gear 30 by raising and lowering the shaft 26. The parts as shown in Fig. 4 have been raised to bring the gear 40 into mesh with the ring gear 30 so that a driving connection is established from the pinion 10 through the gears 41 and 40 to the ring gear 30. In this position the clutch ring 19 is also disengaged from the bars 16 and 17, and the pulley body 6 is therefore free to rotate with respect to the pinion 10 and the shaft 9. The pinion 10, the gears 41 and 40 and the gear 30 constitute a reduction gearing which will cause the pulley body to rotate at a much slower speed than the speed of rotation of the shaft 9. The amount of speed reduction will depend upon the gear ratios used.

The cover member 27 and the shaft 26 have cooperating means whereby to hold the shaft releasably in either of its two operating positions. This cooperating means comprises two spaced recesses 42 and 43 in the shaft and a spring pressed latch member 44 mounted in the cover member 27. The latch member as shown is a ball backed up by a spring 45 that is held in place by a screw 46.

At the end of the pinion 10 the cover member 27 is recessed to provide a chamber 47 into which a reduced extension 48 of the pinion extends. This reduced extension is provided with a ball bearing assembly 49 locked in place on the pinion by two lock nuts 50 and 51 with a lock washer 52 between them. The upper race of the ball bearing assembly 49 fits snugly on the extension 48 while the lower race is given some clearance around the extension and fits tightly in the chamber 47, resting on the shoulder 47' at the bottom of the chamber. By adjusting the nuts 50 and 51 to draw the cover 27 downward any play due to wear of any of the bearing assemblies can be taken up so that a relatively tight condition of the several ball bearing assemblies 13, 33 and 49 can be maintained at all times. This is particularly useful in avoiding the tendency of the pulley to vibrate, which would in turn increase the wear and make a bad condition worse. It will be noted that the three ball bearing assemblies are spaced lengthwise of the pinion 10 and the middle bearing 33 is on the larger radius. This relation assures perfect alignment of the pulley on the pinion. The cover member 27 is provided with a top plate 53 over the chamber 47 and over the recess 39. An oil fitting 54 is provided on the cover member 27 so that oil may be forced into the chamber 47 to keep the parts lubricated. Packing rings of suitable loose fibrous material are provided at 55 about the hub 11 and at 56 about the ring gear 30. The chamber 8 is filled with a lubricant.

It is believed that the operation of the device will be apparent from the foregoing description. However, a brief resume of the operation may prove helpful. Assuming that the shaft 9 is a motor shaft and that a drive belt is located in one of the grooves 7 of the pulley body 6, if it is desired to have the pulley body rotate with the drive shaft the shaft 26 is moved into the position shown in Fig. 1. This brings the clutch ring 19 into engagement with the bars 16 and 17 so as to lock the pulley body 6 to the pinion 10 which in turn is fastened to the shaft 9. This will give a direct drive to the pulley 6. Now, however, if it is desired to drive the pulley 6 at a lower speed without interfering with the rest of the operation of the tool, the operator merely raises the shaft 26, after stopping the motor shaft, until the gear 40 is brought into engagement with the ring gear 30; that is, until the ball 44 engages in the recess 42 of the shaft 26. The shaft 9 is again started and now the pulley will be driven at a much slower speed of rotation than the shaft 9 because the drive is from the shaft 9 and the pinion 10 through the gears 41 and 40 to the ring gear 30 which is fixed to the pulley.

The pulley is supported at both ends by means of the ball bearing 13 and the ball bearings 33. The cover member 27 is mounted by the bracket 36 so that the motor shaft does not have to carry the entire load of the pulley assembly.

No attempt has been made to show the machine tool with the power pulley in place. It is obvious however, that the pulley 6 can be mounted on any suitable drive shaft and that it will function equally well regardless of whether it is used as a straight stepped pulley or as a speed reducing device. I propose to make the pulley body of a light material such as aluminum or aluminum alloy or a plastic composition, and the interior parts of the power pulley can be made of light material so as to make its weight as low as possible. Since the pulley is hollowed out throughout the main body portion and the stepped portion it is not difficult to reduce the weight to a satisfactory level even though steel or cast iron is used.

From the foregoing description it is believed that the nature and advantages of the present invention will be readily apparent to those skilled in this art.

Having thus described my invention, what I claim as new and desire to secure by Letters Patent is:

1. A power pulley of the character described, comprising a hollow body having stepped grooves on the exterior thereof of gradually increasing diameter from one end of the body toward the other, means mounting the pulley on a drive shaft including a shaft opening at the small end of the body, a pinion bearing adjacent to said opening a pinion within said pulley and a cover member having a bearing rotatably mounting the free end of said pinion, said cover member also having a bearing rotatably mounting the pulley, speed reduction gears within said pulley, and manually operable means for alternatively connecting the pulley direct to the drive shaft or to the drive shaft through said speed reduction gears.

2. A power pulley of the character described, comprising a hollow body having stepped grooves on the exterior thereof of gradually increasing diameter from one end of the body toward the other, means mounting the pulley on a drive shaft including a shaft opening at the small end of the body, a pinion bearing adjacent to said opening a pinion within said pulley and a cover member having a bearing rotatably mounting the free end of said pinion, said cover member also having a bearing rotatably mounting the pulley, speed reduction gears within said pulley, and manually operable means for alternatively connecting the pulley direct to the drive shaft or to the drive shaft through said speed reduction gears, said speed reduction gears including a ring gear fixed in the pulley and providing a ball race cooperating with a ball race in the cover member.

3. A power pulley of the character described, comprising a hollow body having stepped grooves on the exterior thereof of gradually increasing diameter from one end of the body toward the other, means mounting the pulley on a drive shaft including a shaft opening at the small end of the body, a pinion bearing adjacent to said opening a pinion within said pulley and a cover member having a bearing rotatably mounting the free end of said pinion, said cover member also having a bearing rotatably mounting the pulley, speed reduction gears within said pulley, and manually operable means for alternatively connecting the pulley direct to the drive shaft or to the drive shaft through said speed reduction gears, said manually operable means including a clutch member movable lengthwise of said pinion.

4. A power pulley comprising a hollow body having a plurality of pulley faces of different diameters thereon, means in said pulley for connecting a drive shaft thereto, said means comprising a pinion rotatably journaled in the pulley and having a socket to receive the drive shaft, a cover member having a bearing for the free end of said pinion, and a clutch member carried by the cover member and movable to connect and disconnect the pulley and the pinion for direct drive.

5. A power pulley comprising a hollow body having a plurality of pulley faces of different diameters thereon, means in said pulley for connecting a drive shaft thereto, said means comprising a pinion rotatably journaled in the pulley and having a socket to receive the drive shaft, a cover member having a bearing for the free end of said pinion, a clutch member movable to connect and disconnect the pulley and the pinion for direct drive, means for operating said clutch member including a shaft having a gear thereon, a second gear connecting the pinion with the first named gear, and an internal ring gear in the pulley, the shaft being movable to bring the first named gear into mesh with the ring gear when the clutch member is moved out of position to establish direct drive between the pulley and the pinion.

6. A device of the character described, comprising a hollow driven body, a pinion in said body and having means to attach a shaft thereto, a bearing at one end of said body for the pinion, a fixed support at the other end of the body, a ball bearing between the body and the support, said pinion having an extension into said support, a ball bearing mounting said extension in said support, means to adjust said last named bearing lengthwise of the pinion, gear means in said body for driving the body at a lower speed than the pinion and clutch means operable to directly connect the body to the pinion or to connect the pinion through said gear means to the body.

EDWARD C. ROTHACKER.